United States Patent [19]

Roberts

[11] 4,309,294
[45] Jan. 5, 1982

[54] N,N'-DISUBSTITUTED 2,4'-DIAMINODIPHENYL ETHERS AS ANTIOXIDANTS

[75] Inventor: John T. Roberts, Des Plaines, Ill.

[73] Assignee: UOP Inc., Des Plaines, Ill.

[21] Appl. No.: 171,863

[22] Filed: Jul. 24, 1980

[51] Int. Cl.$^3$ ............................................. C10M 1/32
[52] U.S. Cl. .............................. 252/51.5 R; 252/47.5; 252/402; 252/403
[58] Field of Search ................. 252/51.5 R, 47.5, 403, 252/402

[56] References Cited

U.S. PATENT DOCUMENTS

| | | | |
|---|---|---|---|
| 2,290,860 | 7/1942 | Burk et al. | 252/51.5 R |
| 2,480,450 | 8/1949 | Cocroft et al. | 252/51.5 R X |
| 3,093,586 | 6/1963 | Cyba | 252/51.5 R |
| 3,122,575 | 2/1964 | Peterson et al. | 252/51.5 R X |
| 3,169,926 | 2/1965 | Symon | 252/51.5 R |
| 3,240,706 | 3/1966 | Cyba et al. | 252/51.5 R |
| 3,502,581 | 3/1970 | Cyba | 252/51.5 R |

FOREIGN PATENT DOCUMENTS 672029 10/1963 Canada ........................... 252/51.5 R Primary Examiner—Andrew Metz
Attorney, Agent, or Firm—James R. Hoatson, Jr.; Eugene I. Snyder; William H. Page, II

[57] ABSTRACT

N,N'-disubstituted 2,4'-diaminodiphenyl ethers are a potent antioxidant for petroleum products and petroleum-related products. In particular, the N,N'-dibenzyl derivative and other aromatic and hetero-aromatic analogs of the dibenzyl derivatives exhibit desirable antioxidant properties at levels as low as about 0.05% by weight.

4 Claims, No Drawings

N,N'-DISUBSTITUTED 2,4'-DIAMINODIPHENYL ETHERS AS ANTIOXIDANTS

BACKGROUND OF THE INVENTION

A persistent problem common to virtually all petroleum products and petroleum-related products is their tendency to undergo oxidative degradation. Oxidation may occur even under the relatively mild conditions attending storage and transport, and is appreciably accelerated when operating conditions are conducive to oxidation processes, for example, the elevated temperatures experienced by lubricating oil. Such oxidative processes not only cause chemical degradation of the petroleum or petroleum-related product, but may also cause appreciable changes in desirable physical properties, such as viscosity, which lead to a deterioration of product performance characteristics. Additionally, the oxidative products themselves may attack materials in contact with the petroleum and petroleum-related products, such as metals in contact with transmission or lubricating oils, thereby causing inefficient performance and, in extreme cases, even mechanical failure.

The class of N,N'-dialkyl-4,4'-diaminodiphenyl ethers is known to have substantial antioxidant properties, and has found utility as an additive protecting petroleum and petroleum-related products against oxidation in their working environment as shown in U.S. Pat. No. 2,982,729. Unsubstituted 2,4'-diaminodiphenyl ether acts as an effective stabilizer against oxidative deterioration, U.S. Pat. No. 2,910,437, and mixtures of alkylated 4,4'- and 2,4'-diaminodiphenyl ethers act synergistically as an inhibitor according to U.S. Pat. No. 2,964,479. It now has been found that N,N'-diarylmethyl-2,4'-diaminodiphenyl ethers are effective oxidants in the aforementioned products. In some cases these ethers display antioxidant properties exceeding those of the symmetrical diaminodiphenyl ethers, thereby permitting their effective use at relatively lower levels. The antioxidants described herein possess the further advantage that structural changes within broad, but nonetheless well-defined, limits are possible, thereby permitting optimization of the antioxidant for a particular product in a specified use.

SUMMARY OF THE INVENTION

The principal object of this invention is to provide a method of inhibiting oxidation in petroleum products and petroleum-related products by the addition thereto of effective amounts of additives having antioxidant properties, and compositions thereof. An embodiment of this invention comprises the use of N,N'-diarylmethyl-2,4'-diaminodiphenyl ethers as an additive in said products. In a more specific embodiment the additive is N,N'-dibenzyl-2,4'-diaminodiphenyl ether and substituted benzyl derivatives thereof. In yet another embodiment the additives are present at a concentration from about 0.05 to about 5% by weight.

DESCRIPTION OF THE INVENTION

The materials of this invention are N,N'-dibenzyl-2,4'-diaminodiphenyl ethers, substituted dibenzyl analogs, and similar N,N'-disubstituted materials where the benzene nucleus of the benzyl group is replaced by other aromatic and by heteroaromatic nuclei. This broad structural class may be referred to as N,N'-diarylmethyl-2,4'-diaminodiphenyl ethers. The discovery of this invention is that the materials of such structure possess potent antioxidant properties and can be effectively used as an additive to retard and inhibit oxidation in petroleum products and petroleum-related products at concentrations as low as about 0.05% by weight.

The additives of the instant application have a common structure represented by the formula:

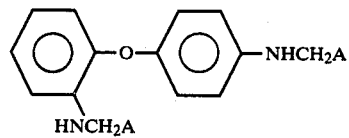

The group represented by A in the above structure is an aromatic or hetero-aromatic ring. Examples of such rings include benzene, naphthalene, anthracene, chrysene, pyridine, thiophene, pyrrole, furan, imidazole, oxazole, thiazole, quinoline, carbazole, pyrimidine, purine, and so forth. Where A is the benzene ring, it will be recognized that the resulting materials are N,N'-dibenzyl-2,4'-diaminodiphenyl ethers. In other cases, it will be recognized that the resulting materials are aromatic and heteroaromatic analogs of the dibenzyl diaminodiphenyl ethers.

In some cases it is advantageous to have the aromatic or hetero-aromatic ring bearing at least one substituent. Among those substituents often leading to enhanced desirable properties are halogen, especially chlorine, nitro, cyano, carboxyl, and hydroxyl moieties. Another class of substituents which may be effectively used in the materials described herein comprises alkyl, alkoxy, and alkylmercapto where the carbonaceous portion contains up to about 18 carbon atoms. Examples of the latter include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. The carbonaceous portion is saturated and may be either a straight or branched chain, although a branched chain is preferred because of increased solubility in products where their use is intended.

From the foregoing description, it may be seen that examples of suitable antioxidants according to this invention, cited solely for illustrative purposes and not intended to be limiting in any way, include N,N'-dibenzyl-2,4'-diaminodiphenyl ether, N,N'-di(1-naphthylmethyl-2,4'-diaminodiphenyl ether, N,N'-di(2-naphthylmethyl)-2,4'-diaminodiphenyl ether, N,N'-di-(1-anthrylmethyl)-2,4'-diaminodiphenyl ether, N,N'-di(2-anthrylmethyl)-2,4'-diaminodiphenyl ether, N,N'-di(9-anthrylmethyl)-2,4'-diaminodiphenyl ether, N,N'-di(2-pyridylmethyl)-2,4'-diaminodiphenyl ether, N,N'-di(3-pyridylmethyl)-2,4'-diaminodiphenyl ether, N,N'-di(4-pyridylmethyl)-2,4'-diaminodiphenyl ether, isomeric N,N'-di(thiopheneylmethyl)-2,4'-diaminodiphenyl ether, isomeric N,N'-di(furylmethyl)-2,4'-diaminodiphenyl ether, and similarly substituted materials where the N,N'-substituents are pyrrole, imidazole, oxazole, thiazole, quinoline, carbazole, pyrimidine, purine, and the like; N,N'-di-(p-methoxybenzyl)-2,4'-diaminodiphenyl ether, N,N'-di-(p-ethoxybenzyl)-2,4'-diaminodiphenyl ether, N,N'-di-(o-methoxybenzyl)-2,4'-diaminodiphenyl ether, similar N,N'-di-(alkoxybenzyl)-2,4'-diaminodiphenyl ethers, N,N'-di-(p-methylbenzyl)-2,4'-diaminodiphenyl ether, N,N'-di-(m-methylbenzyl)-2,4'-diaminodiphenyl ether, N,N'-di-(o-methylbenzyl)-2,4'-diaminodiphenyl ether, N,N'-di-(o-halobenzyl)-2,4'-diaminodiphenyl ether, N,N'-di-(m-halobenzyl)-2,4'-diaminodiphenyl ether, N,N'-di-(p-halobenzyl)-2,4'-diaminodiphenyl ether, N,N'-di-(dichlorobenzyl)-2,4'-diaminodiphenyl ether, N,N'-di-(difluorobenzyl)-2,4'-diaminodiphenyl ether, N,N'-di-(nitrobenzyl)-2,4'-diaminodiphenyl ether, N,N'-di-(cyanobenzyl)-2,4'-diaminodiphenyl ether, N,N'-di-(methylmercaptobenzyl)-2,4'-diaminodiphenyl ether, and N,N'-di-(ethylmercaptobenzyl)-2,4'-diaminodiphenyl ether.

Although the additives of this invention are represented as symmetrically disubstituted diaminodiphenyl ethers, i.e., each group, A, of the above formula is identical, it is to be understood that unsymmetrically disubstituted 2,4'-diaminodiphenyl ethers are within the scope of this invention, i.e., each group, A, of the above formula is different while conforming to the general description and requirements of A as given above.

The preparation of these materials is not novel and suitable methods will be recognized by those skilled in the art. One preparative route comprises the reductive alkylation of 2,4'-diaminodiphenyl ether with an aromatic or heteroaromatic aldehyde, or mixtures thereof. An alternate route is the condensation of 2,4'-diaminodiphenyl ether with an aromatic or heteroaromatic aldehyde, or mixtures of such aldehydes, to afford the Schiff base, with subsequent hydrogenation of the —N=CH-group in the latter to the —NH—CH$_2$-group.

The materials described herein may be used as antioxidants in a wide variety of petroleum and petroleum-related products, and other materials. For example, the materials may be used in lubricating oils and greases, either of synthetic or petroleum origin. Examples, cited for illustrative purposes only, include aliphatic esters, polyalkylene oxides, silicones, phosphoric and silicic acids, fluorine-substituted hydrocarbons, and the like. Lubricating oils of petroleum origin include motor lubricating oil, railroad type lubricating oil, marine oil, transformer oil, transmission oil, turbine oil, gear oil, differential oil, diesel lubricating oil, hydraulic oil, cutting oil, rolling oil, etc. Greases include petroleum grease, whale grease, wool grease, grease from inedible and edible fats, synthetic greases, such as those from mineral or synthetic oils containing hydrocarbon-soluble metal salts of higher fatty acids, and so forth. The materials of this invention also are suitable for the stabilization of plastics and rubbers obtained from polymerization of various petroleum-derived materials, such as polyethylene, polypropylene, polybutadiene, polystyrene, copolymers of ethylene and butadiene, and the like, polyacrylonitrile, polyacrylates, and so forth.

The materials may be effective as an antioxidant at levels as low as about 0.05% by weight. Higher concentrations, up to about 5% by weight or more, may be used if desired, although it will be recognized that it is economically advantageous to use these materials at as low a concentration as will be effective.

The materials described in the example are merely illustrative of this invention. It is to be understood that this invention is not to be limited thereto.

EXAMPLES 1-6

A standardized test was used to screen the suitability of particular compounds as a stable antioxidant. Air at a constant rate of 50 ml per minute was bubbled through the test oil (a bright stock, Sentry 150 from Citgo) which is held at 275° F. in a thermostatically heated aluminum block. The test oil, to which was added the potential antioxidant, was contained in a large test tube with metal coupons of aluminum, brass, copper, and steel. Heating time for the test was a minimum of five days, but was continued until the oil spot test indicated that the test sample had significantly decomposed. Upon termination of the test the precipitation number (PN), acid number (AN), change in the viscosity expressed as a percentage change ($\Delta V$ %), weight gain and weight loss of the coupons were determined. It has been found that the latter data are most significant for copper coupons, thus only these are reported herein.

The oil spot test consists of placing a drop of oil on a Shell Oil chromatography sheet. The appearance of the brown spot with a distinct perimeter or a spot with material at the center or with a definite ring indicates significant decomposition of the base oil. This was used to determine the length of the test subject to a five-day minimum time.

The results of testing are summarized in the accompanying table.

TABLE
PERFORMANCES OF ADDITIVES AS ANTIOXIDANTS

| Example | Additive[a,b] | PN[c] | AN[d] | Wt. loss[e] Cu | Wt. gain[f] Cu | $\Delta V$ %[g] |
|---|---|---|---|---|---|---|
| 1 | none | .005 | 5.3 | 9.5 | 2.0 | 34.5 |
| 2 | C$_6$H$_5$ | .025 | 1.28 | 2.9 | 2.8 | 11.1 |
| 3 | p-CH$_3$OC$_6$H$_4$ | 0.5 | .56 | 2.4 | 2.9 | 7.7 |
| 4 | 1-naphthyl | .013 | 2.30 | 3.0 | 1.8 | 14.1 |
| 5 | p-ClC$_6$H$_4$ | .02 | 0.91 | 2.6 | 2.7 | 9.8 |
| 6 | o-ClC$_6$H$_4$ | .005 | 2.78 | 4.1 | 2.6 | 20.9 |

[a]All additives at 0.5 weight % unless otherwise indicated.
[b]Additives have the formula shown, vide supra, with only A being designated in this column.
[c]Precipitation number, ASTM D-91
[d]Acid number, ASTM D-974
[e]Copper loss in mg.
[f]Weight of residue in mg. deposited on copper coupon.
[g]Percent change in kinematic viscosity at 100° F.

As the data show, the additives described in this invention lead to a substantial decrease in acid number and cause substantially less copper loss when compared to the blank. Equally important is the observation that the additives herein cause only a minor change in viscosity over the lifetime of the test.

What is claimed is:

1. A composition of matter comprising a major amount of a lubricating oil or grease thereof and a minor, antioxidant amount of an additive consisting essentially of an ether of the structure:

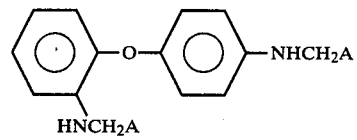

wherein A is a radical selected from the group consisting of pyridine, thiophene, pyrrole, furan, imidazole, oxazole, thiazole, quinoline and carbazole radicals.

2. The composition of claim 1 wherein A is the pyridine ring.

3. The composition of claim 1 wherein said ether is in an amount of from about 0.05 to about 5% by weight.

4. A composition of matter comprising a major amount of a lubricating oil or grease thereof and a minor antioxidant amount of a pyridyl-substituted diaminodiphenyl ether.

* * * * *